US009665459B2

(12) United States Patent
Banerjee et al.

(10) Patent No.: US 9,665,459 B2
(45) Date of Patent: May 30, 2017

(54) PROVIDING A USER INTERFACE TO ENABLE SELECTION OF STORAGE SYSTEMS, COMPONENTS WITHIN STORAGE SYSTEMS AND COMMON PERFORMANCE METRICS FOR GENERATING PERFORMANCE METRIC REPORTS ACROSS STORAGE SYSTEMS AND COMPONENTS

(71) Applicant: International Business Machines Corporation, Armonk, NY (US)

(72) Inventors: Biswadeep Banerjee, Banglaore (IN); Michael L. Lamb, Leander, TX (US); Mack E. Phelps, Raleigh, NC (US); Rai Balwant, Banglaore (IN)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/148,651

(22) Filed: Jan. 6, 2014

(65) Prior Publication Data

US 2015/0193323 A1  Jul. 9, 2015

(51) Int. Cl.
 *G06F 11/34* (2006.01)
 *G06F 11/32* (2006.01)
(52) U.S. Cl.
 CPC ......... *G06F 11/3409* (2013.01); *G06F 11/32* (2013.01); *G06F 11/323* (2013.01); *G06F 11/3485* (2013.01); *G06F 11/3419* (2013.01)
(58) Field of Classification Search
 None
 See application file for complete search history.

(56) References Cited

U.S. PATENT DOCUMENTS 5,463,775 A * 10/1995 DeWitt ................. G06F 11/323
                                                     702/186
6,886,020 B1 * 4/2005 Zahavi ................ G06F 11/3476
(Continued)

OTHER PUBLICATIONS

Jing Xia et al., "An Online Visualization System for Streaming Log Data of Computing Clusters," Tsinghua Science and Technology, dated Apr. 2013, v.18, n.2, pp. 196-205.

*Primary Examiner* — Alexander Satanovsky
*Assistant Examiner* — John Kuan
(74) *Attorney, Agent, or Firm* — David W. Victor; Konrad, Raynes, Davda and Victor LLP

(57) ABSTRACT

A storage system graphical user interface (GUI) renders indication of a plurality of selected storage systems. Selection is received of selected storage systems from the rendered indication of selected storage systems and a determination is made of performance metrics common to the selected storage systems. A performance metric GUI enabling selection of the determined performance metrics common to the selected storage systems is generated. In response to user selection of at least one selected performance metric of the determined performance metrics in the performance metric GUI, determination is made of performance metric values for the at least one of the selected performance metrics for the selected storage systems. A computer renderable visualization providing a visual comparison for each of the at least one selected performance metric of the determined performance metric values is generated for the selected storage systems.

20 Claims, 21 Drawing Sheets

(56) References Cited

U.S. PATENT DOCUMENTS

| | | | |
|---|---|---|---|
| 6,966,033 B1 * | 11/2005 | Gasser | H04L 41/22 |
| | | | 715/738 |
| 6,975,963 B2 | 12/2005 | Hamilton et al. | |
| 6,988,054 B2 | 1/2006 | Giffords | |
| 7,441,154 B2 | 10/2008 | Klotz et al. | |
| 7,844,701 B2 | 11/2010 | Ramany et al. | |
| 8,032,621 B1 | 10/2011 | Upalekar et al. | |
| 8,090,833 B2 | 1/2012 | DeHaan | |
| 2010/0318931 A1 * | 12/2010 | Boykin | G06F 3/0482 |
| | | | 715/771 |
| 2011/0261055 A1 | 10/2011 | Wong et al. | |
| 2012/0110460 A1 | 5/2012 | Wilson | |
| 2013/0106906 A1 | 5/2013 | Roche et al. | |
| 2013/0124714 A1 | 5/2013 | Bednar | |
| 2013/0247044 A1 | 9/2013 | Bingham et al. | |

* cited by examiner

Performance Metric Selection GUI

Compare Performance of Multiple Storage Systems

Performance metrics: [Add Metric] [Remove Metric]

| Category of Performance Metric | Performance Metric |
|---|---|
| Response Time | Overall Response Time (ms/op) |
| I/O Rate | Overall Read I/O Rate (ops/s) |
| Data Rate | Read Data Rate (MiB/s) |
| Cache Percentage | Overall Read Cache Hit Percentage — 606 |

Dropdown 608:
- Overall Read Cache Hit Percentage
- Overall Write Cache Hit Percentage
- Total Overall Cache Hit Percentage Interval: Daily
Reporting Period: Last 7 days

[<Back] [Cancel] [Finish]

Performance Metric Selection GUI

Compare Performance of Multiple Storage Systems

Performance metrics: [Add Metric] [Remove Metric]

| Category of Performance Metric | Performance Metric |
|---|---|
| Response Time | Overall Response Time (ms/op) |
| I/O Rate | Overall Read I/O Rate (ops/s) |
| Data Rate | Read Data Rate (MiB/s) |
| Cache Percentage | Overall Read Cache Hit Percentage |

Interval: Daily
Reporting Period: Last 7 days

[<Back] [Cancel] [Finish]

FIG. 8

Computer Renderable Storage System Performance Table — 800

Overall Response Time (ms/op) — 802₁

| 804₁ | Storage System 2 | Storage System 8 | Storage System 10 |
|---|---|---|---|
| Sep 20, 2013 | 2.86 | 1.44 | 4.83 |
| Sep 21, 2013 | 3.04 | 1.46 | 4.57 |
| Sep 22, 2013 | 3.12 | 1.01 | 4.40 |
| Sep 23, 2013 | 2.90 | 1.08 | 6.72 |
| Sep 24, 2013 | 2.47 | 0.88 | 2.15 |
| Sep 25, 2013 | | | 5.49 |
| Average | 2.88 | 1.17 | 4.69 |

Overall Read I/O Rate (ops/s) — 802₂

| | Storage System 2 | Storage System 8 | Storage System 10 |
|---|---|---|---|
| Sep 20, 2013 | 3,913.69 | 2,432.90 | 10.31 |
| Sep 21, 2013 | 2,734.90 | 1,755.99 | 0.00 |
| Sep 22, 2013 | 3,229.07 | 2,796.94 | 0.00 |
| Sep 23, 2013 | 2,974.10 | 593.86 | 1.82 |
| Sep 24, 2013 | 2,790.63 | 1,897.58 | 0.01 |
| Sep 25, 2013 | | | 8.89 |
| Average | 3,128.48 | 1,895.45 | 3.50 |

Read Data Rate (MiB/s) — 802₃

| | Storage System 2 | Storage System 8 | Storage System 10 |
|---|---|---|---|
| Sep 20, 2013 | 174.04 | 26.51 | 1.61 |
| Sep 21, 2013 | 134.20 | 61.59 | 0.00 |
| Sep 22, 2013 | 248.18 | 32.40 | 0.00 |
| Sep 23, 2013 | 126.77 | 17.16 | 0.27 |
| Sep 24, 2013 | 125.24 | 25.85 | 0.00 |
| Sep 25, 2013 | | | 1.34 |
| Average | 161.69 | 32.70 | 0.54 |

Overall Read Cache Hit Percentage — 802₄

| | Storage System 2 | Storage System 8 | Storage System 10 |
|---|---|---|---|
| Sep 20, 2013 | 60.11% | 23.82% | 94.99% |
| Sep 21, 2013 | 53.28% | 56.42% | 0.00% |
| Sep 22, 2013 | 55.34% | 28.97% | 54.76% |
| Sep 23, 2013 | 57.76% | 55.52% | 84.50% |
| Sep 24, 2013 | 58.51% | 47.81% | 18.98% |
| Sep 25, 2013 | | | 91.38% |
| Average | 57.00% | 42.51% | 57.44% |

FIG. 13

1300 — Overall Response Time (ms/op) — $1302_1$

| 1304 → | Storage System 2 | | | | Storage System 8 | | |
|---|---|---|---|---|---|---|---|
| 1306 → | ckd_7 | mvs_ckd_1 | TSMSVC_DP34 | TSMSVC_DP49 | archlog_pool0 | stgpool_pool9 | |
| Sep 20, 2013 | 0.00 | 0.90 | 0.88 | 0.88 | 14.57 | 2.09 | |
| Sep 21, 2013 | 0.00 | 0.59 | 3.11 | 4.86 | 11.74 | 3.32 | |
| Sep 22, 2013 | 0.00 | 2.76 | 2.05 | 2.64 | 10.15 | 1.78 | |
| Sep 23, 2013 | 1.78 | 0.75 | 1.37 | 1.49 | 13.29 | 1.29 | |
| Sep 24, 2013 | 3.68 | 0.42 | 2.22 | 3.29 | 11.70 | 1.50 | |
| Average | 1.09 | 1.08 | 1.93 | 2.63 | 12.29 | 1.99 | |

Overall Read I/O Rate (ops/s) — $1302_2$

| | Storage System 2 | | | | Storage System 8 | |
|---|---|---|---|---|---|---|
| | ckd_7 | mvs_ckd_1 | TSMSVC_DP34 | TSMSVC_DP49 | archlog_pool0 | stgpool_pool9 |
| Sep 20, 2013 | 0.00 | 8.32 | 0.47 | 0.45 | | 1.44 |
| Sep 21, 2013 | 0.00 | 0.02 | 6.04 | 6.90 | | 1.49 |
| Sep 22, 2013 | 0.00 | 0.15 | 28.12 | 33.18 | | 1.48 |
| Sep 23, 2013 | 0.06 | 7.76 | 0.18 | 0.12 | | 1.48 |
| Sep 24, 2013 | 0.01 | 0.11 | 17.50 | 18.21 | | 1.55 |
| Average | | 3.27 | 10.46 | 11.77 | | 1.49 |

Total Data Rate (MiB/s) — $1302_3$

| | Storage System 2 | | | | Storage System 8 | |
|---|---|---|---|---|---|---|
| | ckd_7 | mvs_ckd_1 | TSMSVC_DP34 | TSMSVC_DP49 | archlog_pool0 | stgpool_pool9 |
| | 0.00 | 22.33 | 6.59 | 7.92 | 1.90 | 14.95 |
| | 0.00 | 0.09 | 8.74 | 8.92 | 1.78 | 10.73 |
| | 0.00 | 1.52 | 268.55 | 318.05 | 2.22 | 8.30 |
| | 0.00 | 14.11 | 4.90 | 4.12 | 0.78 | 9.82 |
| | 1.26 | 0.32 | 91.43 | 94.43 | 3.84 | 18.40 |
| | 0.25 | 7.68 | 76.04 | 86.69 | 2.11 | 12.44 |

(stgpool_pool9 values left column: 1.17, 17.70, 0.83, 6.13, 0.82, 5.33)

Overall Transfer Size (KiB/op) — $1302_4$

| | Storage System 2 | | | | Storage System 8 | |
|---|---|---|---|---|---|---|
| | ckd_7 | mvs_ckd_1 | TSMSVC_DP34 | TSMSVC_DP49 | archlog_pool0 | stgpool_pool9 |
| | 0.00 | 45.47 | 79.18 | 67.06 | 219.41 | 249.78 |
| | 0.00 | 17.36 | 15.64 | 13.77 | 204.22 | 249.61 |
| | 0.00 | 122.35 | 156.49 | 158.07 | 227.18 | 241.32 |
| | 14.22 | 27.04 | 120.34 | 133.65 | 126.69 | 238.31 |
| | 212.53 | 3.91 | 71.32 | 69.36 | 261.40 | 247.05 |
| | 45.35 | 43.23 | 88.59 | 88.38 | 207.78 | 245.21 |

FIG. 13

PROVIDING A USER INTERFACE TO ENABLE SELECTION OF STORAGE SYSTEMS, COMPONENTS WITHIN STORAGE SYSTEMS AND COMMON PERFORMANCE METRICS FOR GENERATING PERFORMANCE METRIC REPORTS ACROSS STORAGE SYSTEMS AND COMPONENTS

BACKGROUND OF THE INVENTION

1. Field of the Invention

The present invention relates to a computer program product, system, and method for providing a user interface to enable selection of storage systems, components within storage systems and common performance metrics for generating performance metric reports across storage systems and components.

2. Description of the Related Art

In a Storage Area Network (SAN) environments, storage devices have specific set of performance metrics collected using a storage resource management solution or product. A storage administrator would use these metrics gathered separately from the different devices to analyze and improve the performance of the systems or troubleshoot when required.

SUMMARY

Provided are a computer program product, system, and method for providing a user interface to enable selection of storage systems, components within storage systems and common performance metrics for generating performance metric reports across storage systems and components. A storage system graphical user interface (GUI) renders indication of a plurality of selected storage systems, wherein each of the displayed storage systems includes components comprising usable storage space configured in storage devices and computational resources. Selection is received of selected storage systems from the rendered indication of selected storage systems and a determination is made of performance metrics common to the selected storage systems. A performance metric GUI enabling selection of the determined performance metrics common to the selected storage systems is generated. In response to user selection of at least one selected performance metric of the determined performance metrics in the performance metric GUI, determination is made of performance metric values for the at least one of the selected performance metrics for the selected storage systems. A computer renderable visualization providing a visual comparison for each of the at least one selected performance metric of the determined performance metric values is generated for the selected storage systems.

BRIEF DESCRIPTION OF THE DRAWINGS

FIGS. 6*a*, 6*b*, and 6*c* illustrate embodiments of a GUI to allow performance metric selection for storage systems.

FIGS. 8 and 13 illustrate embodiments of a computer renderable storage system table.

DETAILED DESCRIPTION

Described embodiments provide techniques to allow users to gather performance metrics across storage systems that may be from different vendors and heterogeneous, such as virtual and non-virtual storage systems including performance metric information on components of the storage systems. Described embodiments allow the user to select storage systems, components across storage systems, and different performance metrics and generate a computer renderable visualization providing a visual comparison for each of the at least one selected performance metric of the determined performance metric values for the selected storage systems or selected components within storage systems.

Figure 1:
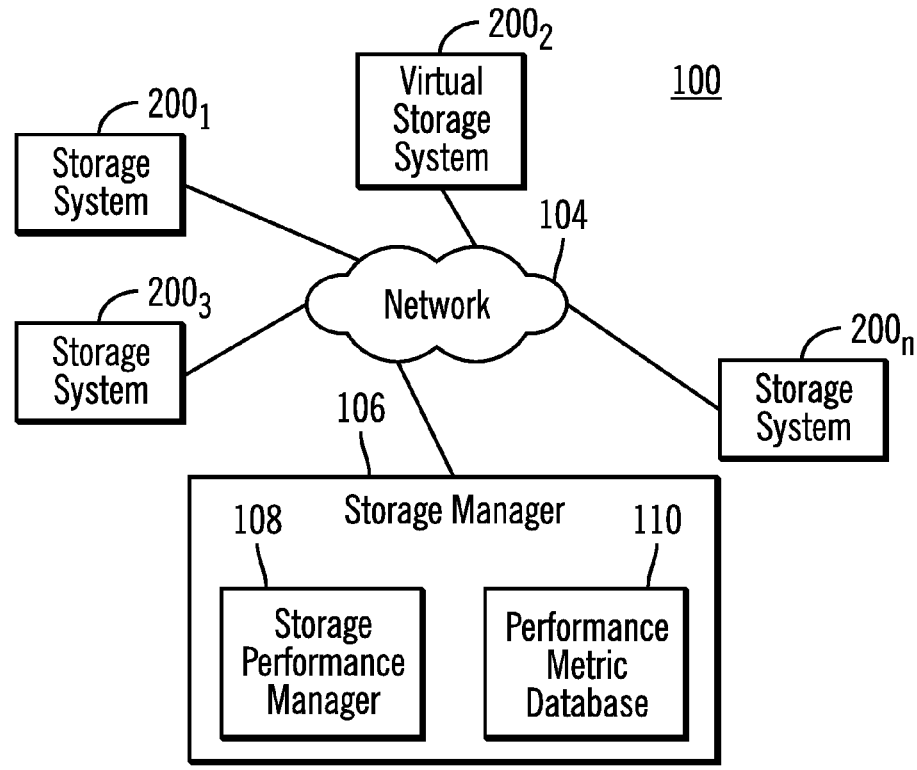
FIG. 1 illustrates an embodiment of a storage environment.

FIG. 1 illustrates an embodiment of a storage environment 100 including a plurality of storage systems $200_1$, $200_2$, $200_3$ ... $200_n$ connected over a network 104, including physical systems as well as virtual systems. The variable "n" indicates that there are any number of storage systems in the storage network 100. Storage manager 106 communicates with the storage systems $200_1$, $200_2$, $200_3$ ... $200_n$ over the network 104 to gather performance metrics on the components of the storage systems $200_1$, $200_2$, $200_3$ ... $200_n$ to store in a performance metrics database 110, such as response times (e.g., overall response time, read response time, write response time), I/O rate (e.g., write I/O rate, read I/O write, overall read rate), cache percentage (overall read cache hit percentage, overall write cache hit percentage, overall cache hit percentage, etc.), transfer rate at which read and write data is transferred, transfer size of read and write data transferred, etc.

The storage manager 106 includes a storage performance manager 108 comprising a program module to gather the metric data from the storage systems $200_1$, $200_2$, $200_3$ ... $200_n$ and to store in the performance metric database 110 to gather performance metric values.

Figure 2:
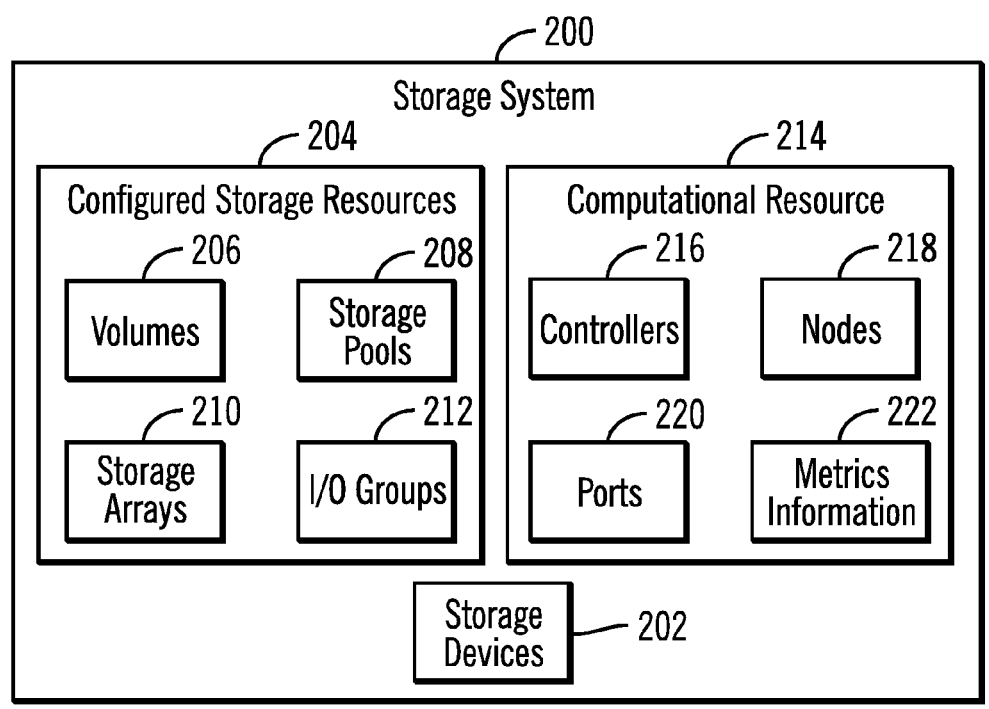
FIG. 2 illustrates an example of a storage system in the computing environment.

FIG. 2 illustrates an embodiment of components in a storage system 200, such as one of the storage systems $200_1$, $200_2$, $200_3$, ... , $200_n$. The storage system 200 includes configured storage resources 204 comprising logical storage space configured in physical storage devices 202 that is allocated for use or management, including volumes 206, storage pools 208, storage arrays 210 (e.g., Redundant Array of Independent Disks (RAID), Direct Access Storage Device (DASD), managed disks, etc), and I/O groups 212, among others. The storage system 200 further includes computational resources 214, such as controllers 216, nodes 218, such as processing nodes, ports 220 for communication with the physical storage devices 202 and the network 104, and performance metric information 222. The controllers 216 may gather performance information with respect to configured storage resources 202, computational resources 214, and storage devices 202, such as overall, read and write statistics including response times, I/O rate, data rate, transfer size, cache percentages, etc. The metrics information 222 may further indicate a time the data was gathered.

The storage devices 202 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The network 104 may comprise an interconnected network (e.g., Intranet, Internet, Local Area Network (LAN), Storage Area Network (SAN), etc.).

Figure 3:
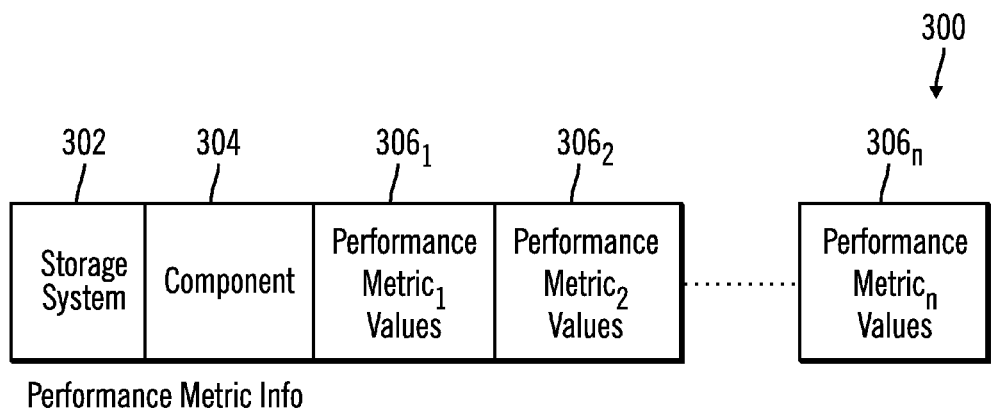
FIG. 3 illustrates an embodiment of performance metric information.

FIG. 3 illustrates an embodiment of performance metric information 300 maintained in the performance metric database 110, including a storage system identifier 302; an identifier of a component 304 in the storage system 302 for which the performance metric values $306_1, 306_2 \ldots 306_n$ are gathered, such as a unique identifier of any of the configured storage resources 204, storage devices 202, and computational resources 214; and values for one or more performance metrics $306_1, 306_2 \ldots 306_n$ gathered for the component 304, including by way of example, but not limited to, response times (e.g., overall response time, read response time, write response time), I/O rate (e.g., write I/O rate, read I/O write, overall read rate), cache percentage (Overall read cache hit percentage, overall write cache hit percentage, overall cache hit percentage, etc.), transfer rate at which read and write data is transferred, transfer size of read and write data transferred, etc.

Figure 4:
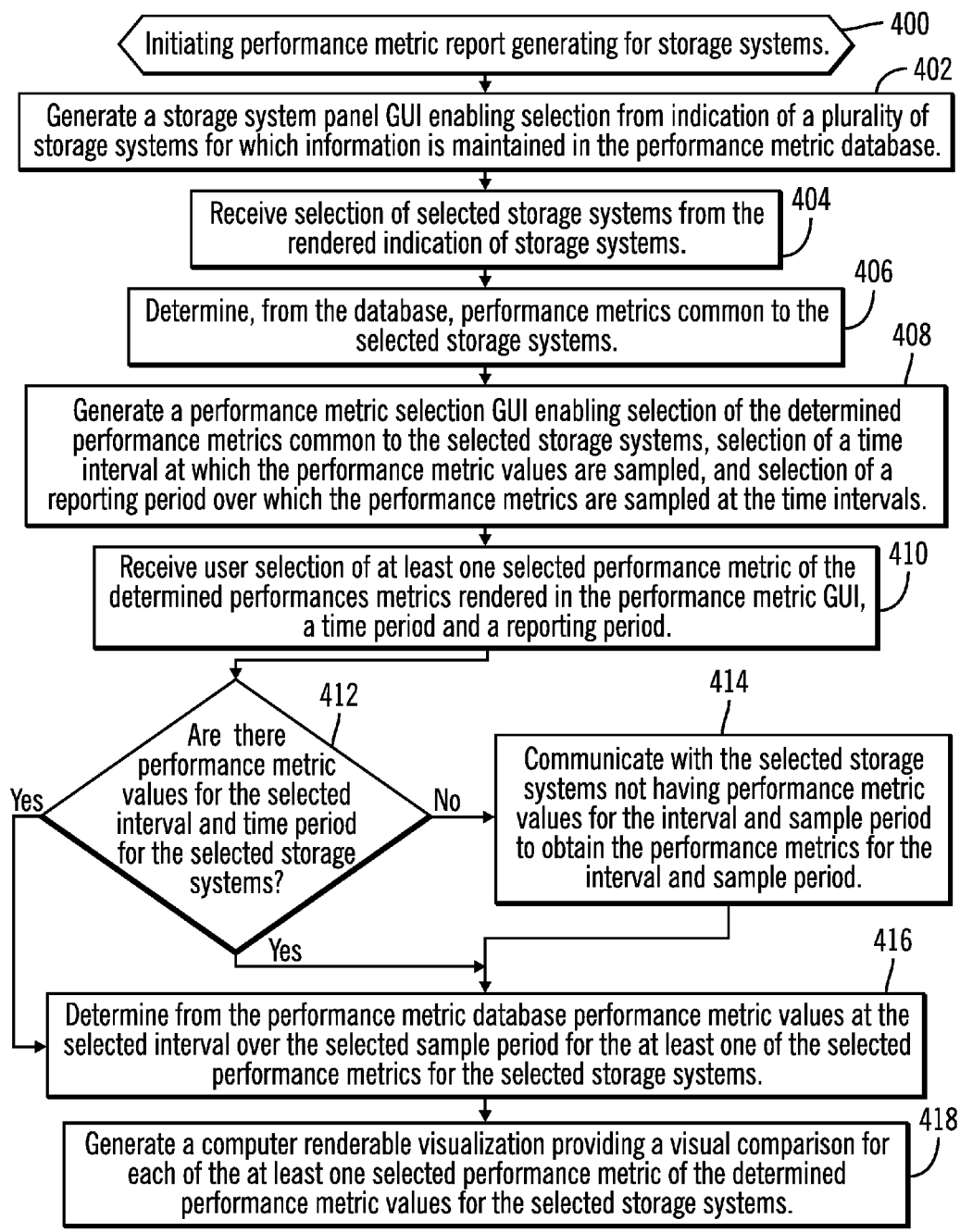
FIGS. 4 and 9*a* and 9*b* illustrate embodiments of operations to generate a performance metric report.
Figure 5:
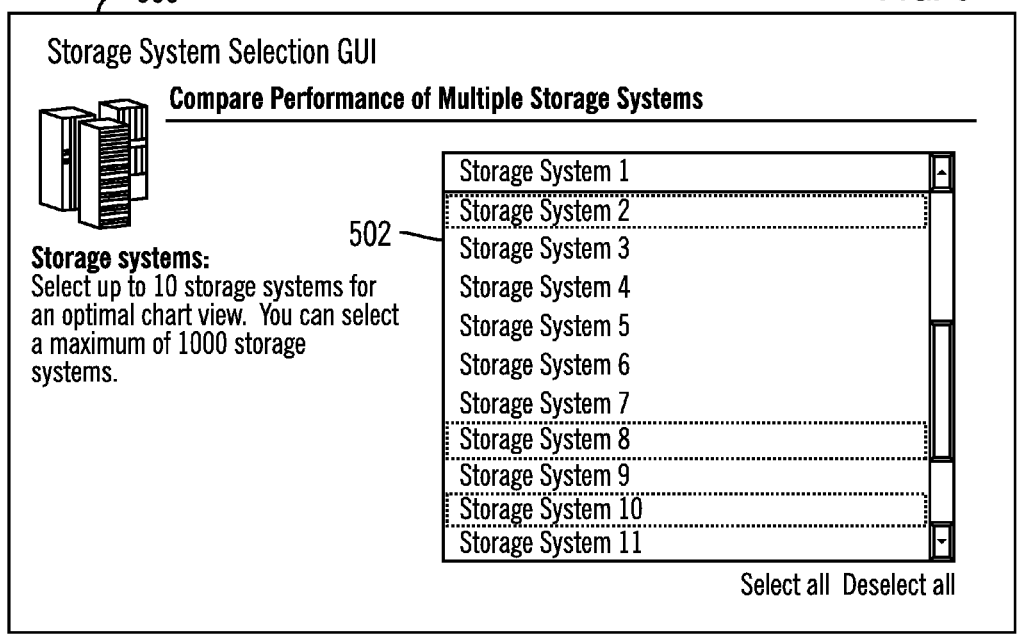
FIG. 5 illustrates an embodiment of a storage system selection graphical user interface (GUI).
Figure 6A:
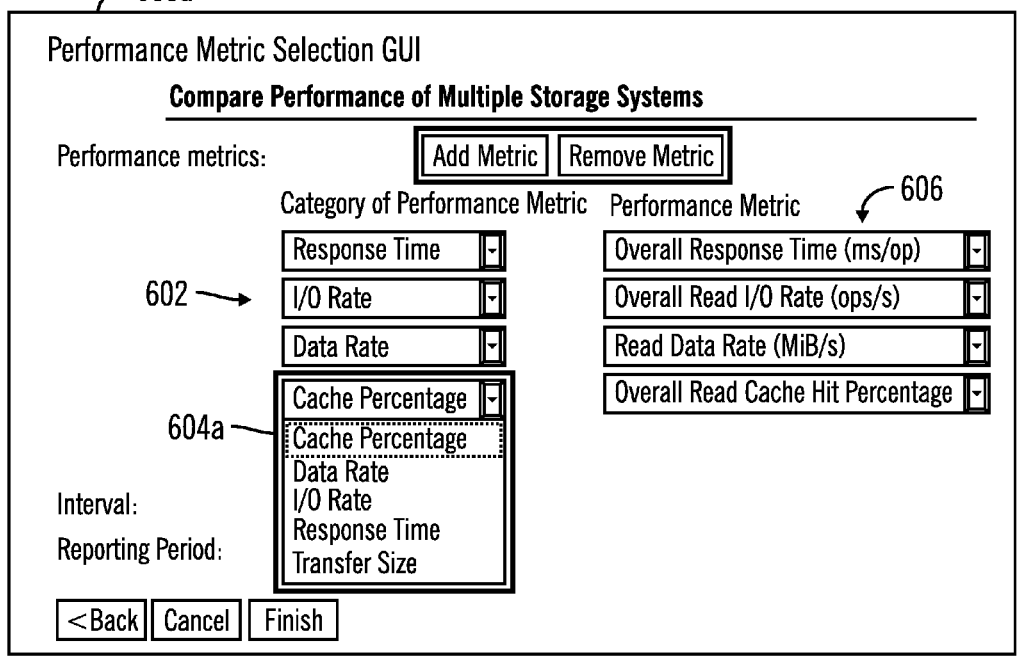
Figure 7:
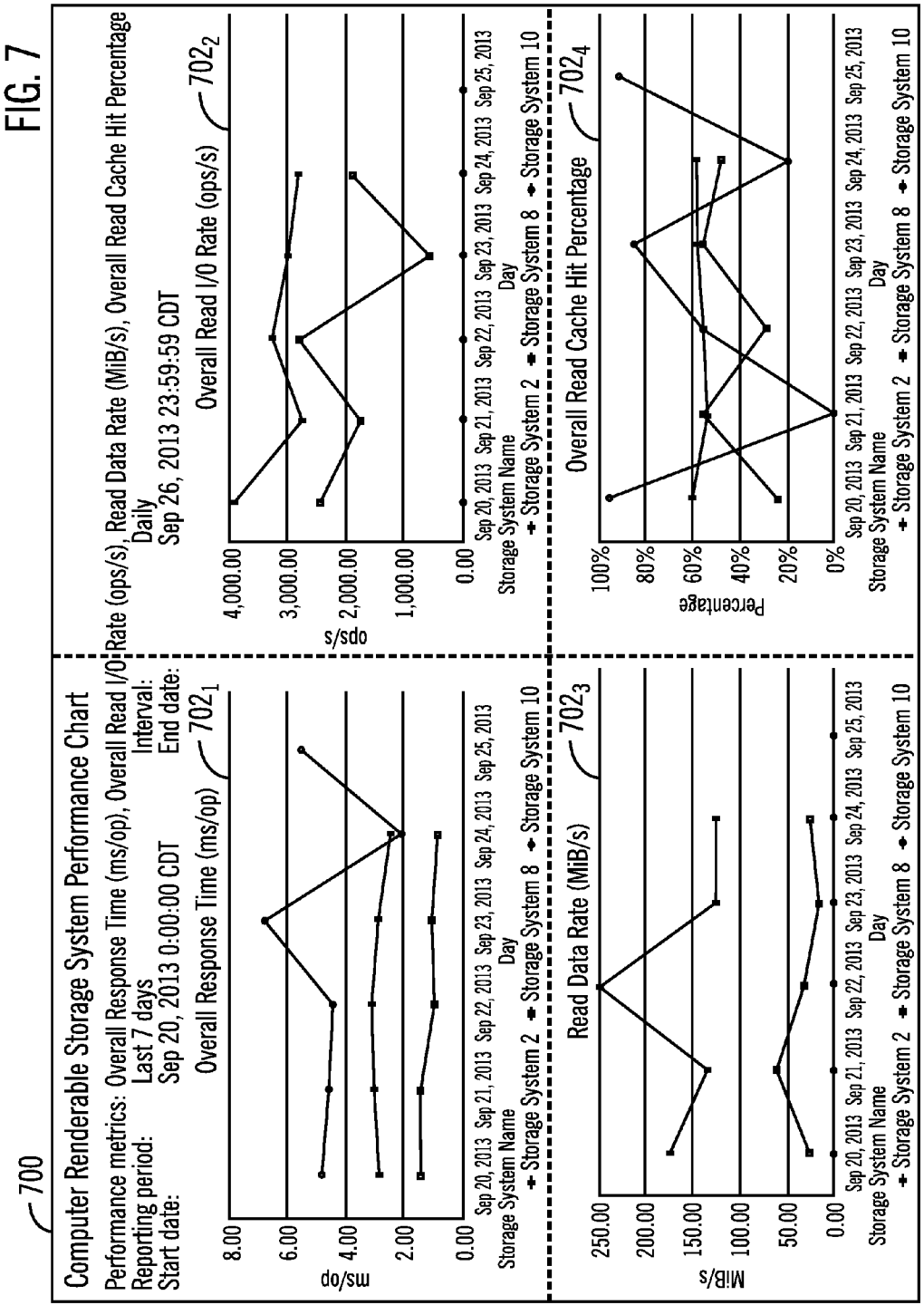
FIGS. 7, 7A, 7B, 7C, 7D, 12, 12A, 12B, 12C, and 12D illustrate embodiments of a computer renderable storage system performance chart.
Figure 7A:
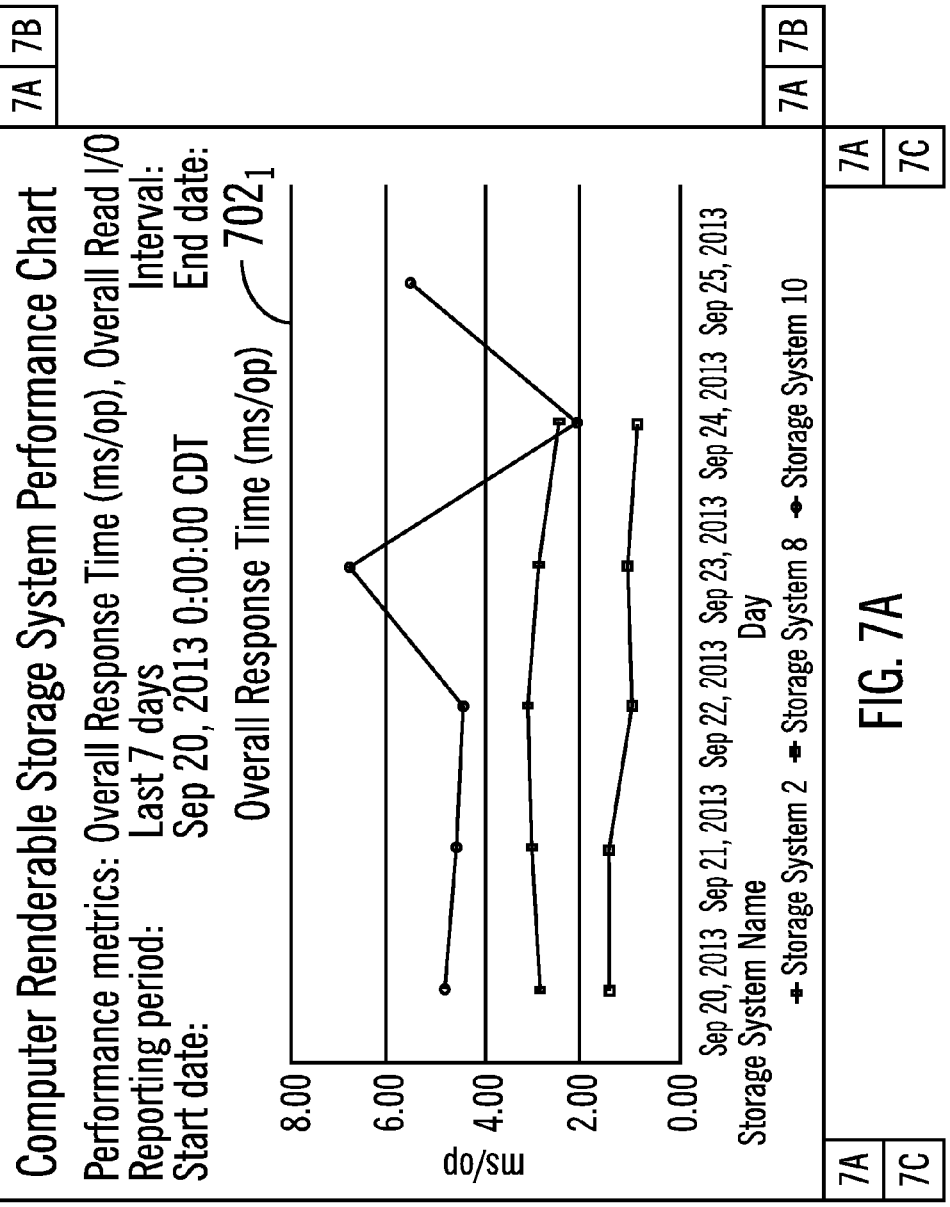
Figure 7B:
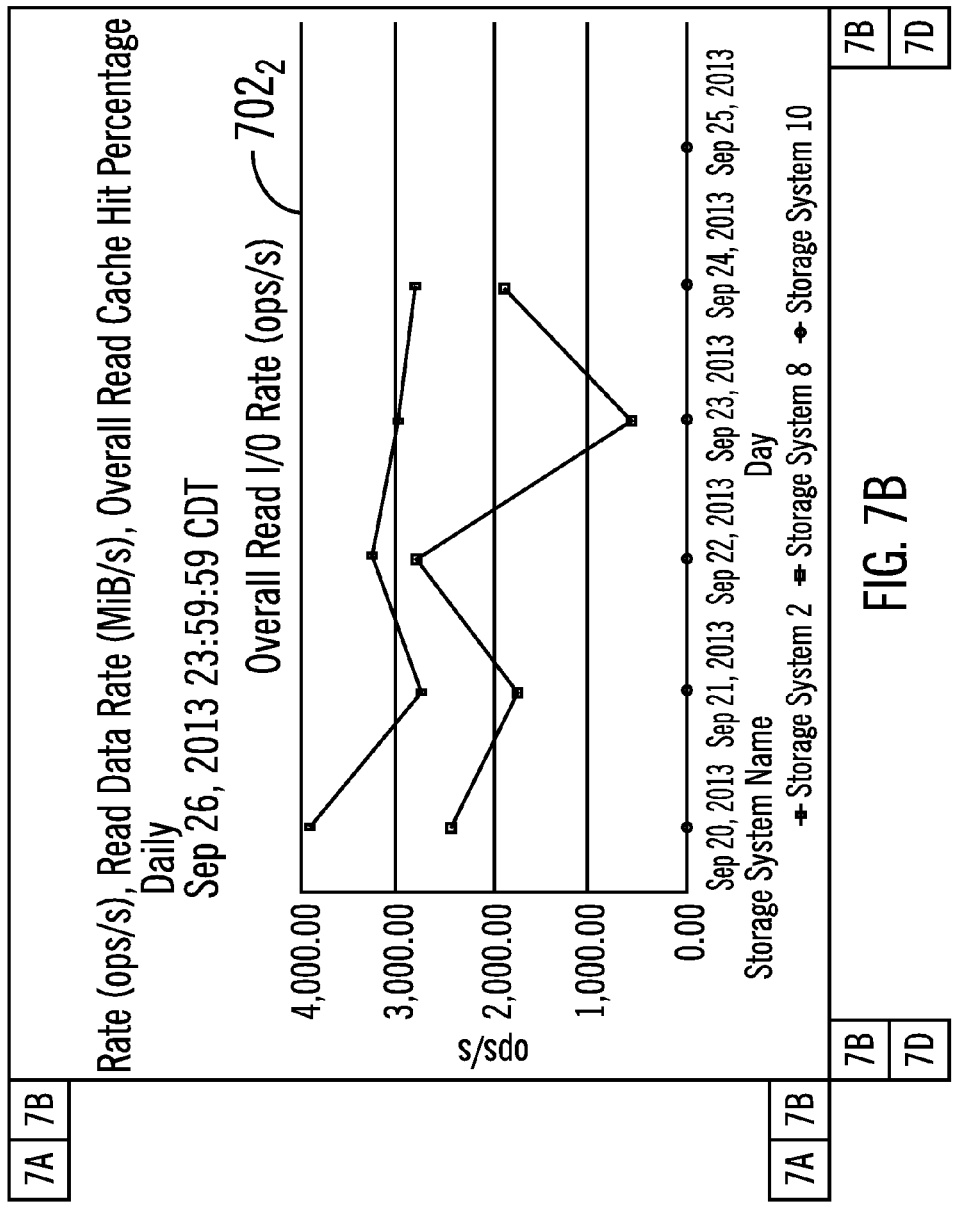
Figure 7C:
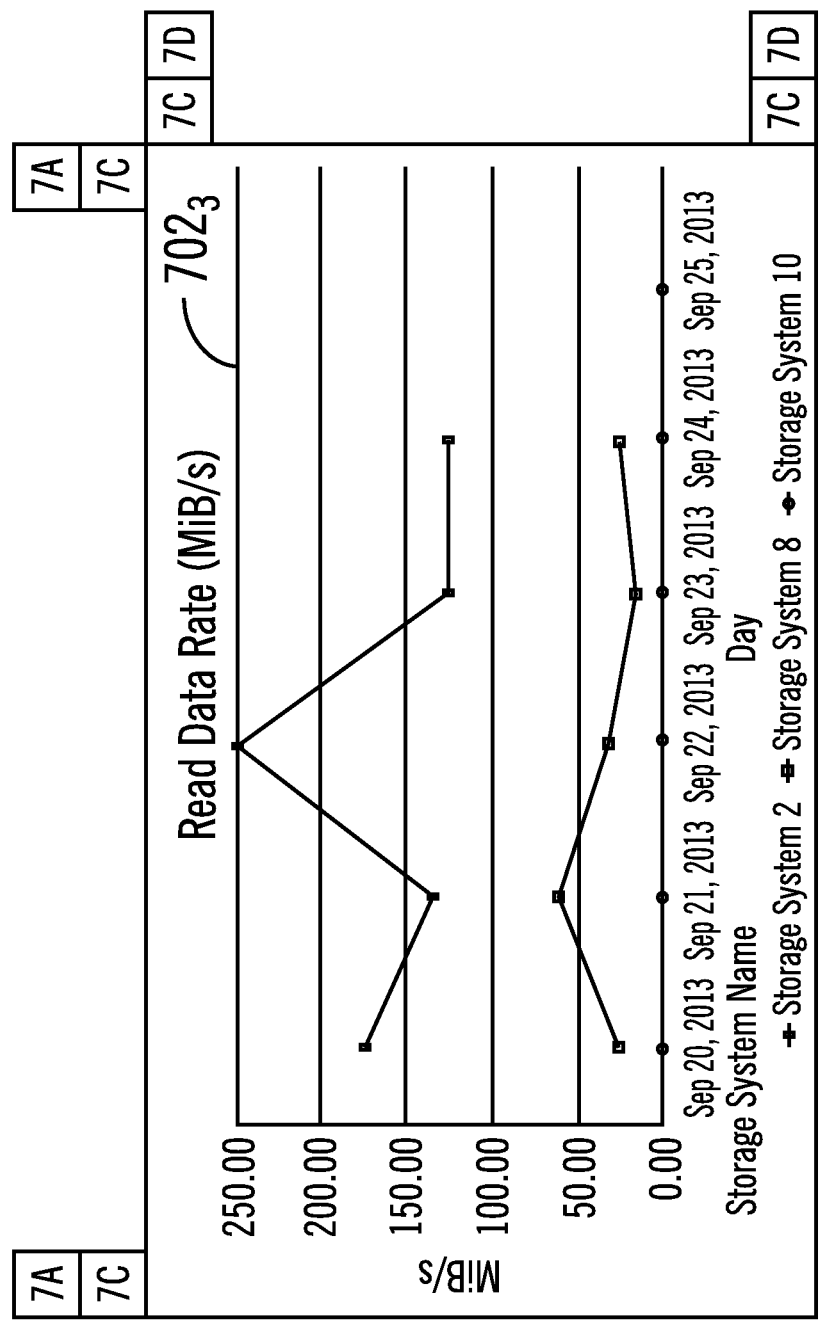

FIG. 4 illustrates an embodiment of operations performed by the storage performance manager 108 to provide a series of graphical user interface (GUI) panels, as shown in FIGS. 5, 6a, 6b, and 6c to enable a user to select options to generate performance reports, as shown in FIGS. 7 and 8, that compares performance metrics across storage systems $200_1, 200_2, 200_3 \ldots 200_n$. Upon initiating (at block 400) performance metric report generating, the storage performance manager 108 generates (at block 402) a storage system selection GUI enabling selection from indication of a plurality of storage systems $200_1, 200_2, 200_3 \ldots 200_n$ for which information 300 is maintained in the performance metric database 110. FIG. 5 illustrates an example of a storage system selection GUI 500 having a drop down menu 502 from which the user may select one of the displayed storage systems $200_1, 200_2, 200_3 \ldots 200_n$, where the selected storage systems are shown as highlighted.

Upon receiving (at block 404) selection of selected storage systems from the rendered indication of storage systems in the storage system selection GUI 500, the storage performance manager 108 determines (at block 406) from the performance metric database 110 performance metrics common to the selected storage systems. This may be determined from the performance metric information 300 for the selected storage systems 300 that are common among all the selected storage systems $200_1, 200_2, 200_3 \ldots 200_n$. The storage performance manager 108 generates (at block 408) a performance metric selection GUI enabling selection of the determined performance metrics common to the selected storage systems, selection of a time interval at which the performance metric values are sampled, and selection of a reporting period over which the performance metrics are sampled at the time intervals.

FIGS. 6a, 6b, 6c illustrate examples of the performance metric selection GUI 600a, 600b, 600c for storage systems showing different categories of selected performance metrics 602 common to the selected storage systems that may be selected. A drop down menu 604a in FIG. 6a is displayed showing the different common performance metric types for the selected components, such as cache percentage, data rate, I/O rate, response time, and transfer size. The performance metric selection GUIs have the selected performance metrics 606 selected for the selected categories 602, such as overall response time, overall read I/O rate, read data rate, and overall read cache hit percentage. Instance 600b of the performance metric selection GUI shows a drop down menu 608 from which the user selects a specific performance metric for the selected cache percentage performance metric type, where in FIG. 6b the selection is shown as Overall Write Cache Hit Percentage.

Upon receiving (at block 410) user selection of at least one selected performance metric of the determined performances metrics rendered in the performance metric GUI 600a, 600b, 600c, a time period and a reporting period, the storage performance manager 108 determines (at block 412) whether the performance metric database 110 includes performance metric values for the selected interval and time period for the selected storage systems. If there are not performance metric values for the selected interval and time period, then the storage performance manager 108 communicates (at block 414) with the selected storage systems $200_1, 200_2, 200_3 \ldots 200_n$ not having performance metric values for the interval and sample period to obtain the performance metrics for the interval and sample period and store in the performance metric database 110. If (at block 412) the performance metric database 110 has the values for the interval and time period or after obtaining requested metrics (from block 414), the storage performance manager 8 determines (at block 416) from the performance metric database 110 performance metric values at the selected interval over the selected sample period for the at least one of the selected common performance metrics for the selected storage systems. The storage performance manager 108 generates (at block 418) a computer renderable visualization providing a visual comparison for each of the at least one selected performance metric of the determined performance metric values for the selected storage systems.

Figure 7D:
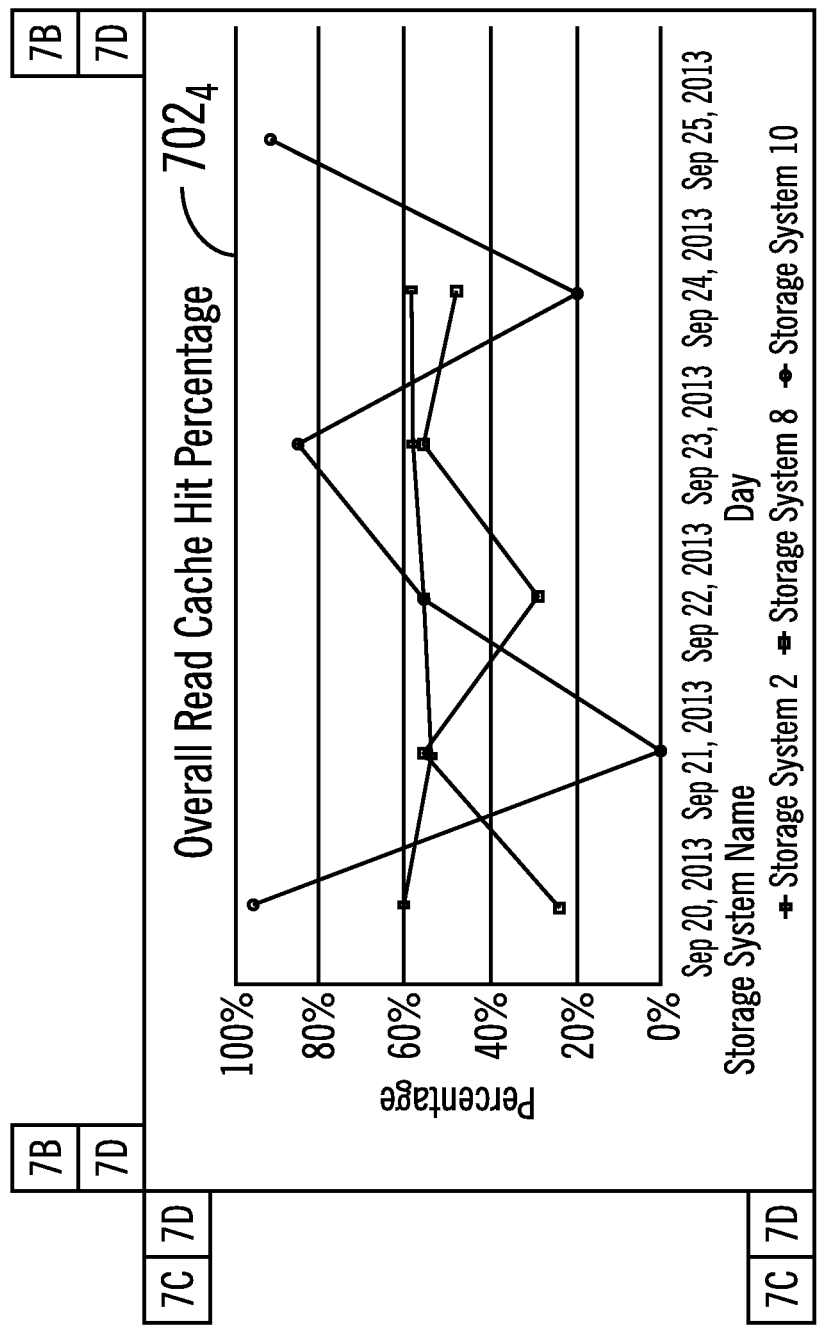

A computer renderable visualization may comprise a computer readable file having computer code to instruct a computer how to render the content therein, including performance metric values across storage systems $200_1, 200_2, 200_3 \ldots 200_n$ and their components, FIG. 7 illustrates an example of a computer renderable storage system performance chart 700 generated at block 418 in FIG. 4, where FIGS. 7A, 7B, 7C, and 7D provide expanded views of the panels in FIG. 7. FIG. 7 shows a plurality of sub-visualizations for the selected performance metrics that provides for each selected performance metric a chart having a graph of the performance metric values over the selected storage systems. FIG. 7 shows four sub-visualizations including an overall response time (ms/operation) visualization $702_1$ (FIG. 7A), an overall read I/O rate visualization (operations per second) $702_2$ (FIG. 7B), a read data rate $702_3$ (MB per second) (FIG. 7C), and an overall read cache hit percentage $702_4$ (FIG. 7D). Two of the visualizations $702_1$ and $702_4$ provide values for the selected common performance metrics for four of the selected storage systems and two others $702_2$ and $702_3$ provide visualizations for two of the storage systems.

FIG. 8 illustrates an example of a computer renderable storage system performance chart 800 table generated at block 418 in FIG. 4. FIG. 8 shows a plurality of sub-visualizations for the selected performance metrics that shows for each common performance metric a column of values for each of the selected storage systems. FIG. 8 shows four sub-visualizations including an overall response time (ms/operation) visualization $802_1$, an overall read I/O rate visualization (operations per second) $802_2$, a read data rate $802_3$ (MB per second), and an overall read cache hit percentage $802_4$. The metric values for each of three storage systems $804_1$, $804_2$, and $804_3$ are provided in each of the visualizations.

Figure 9A:
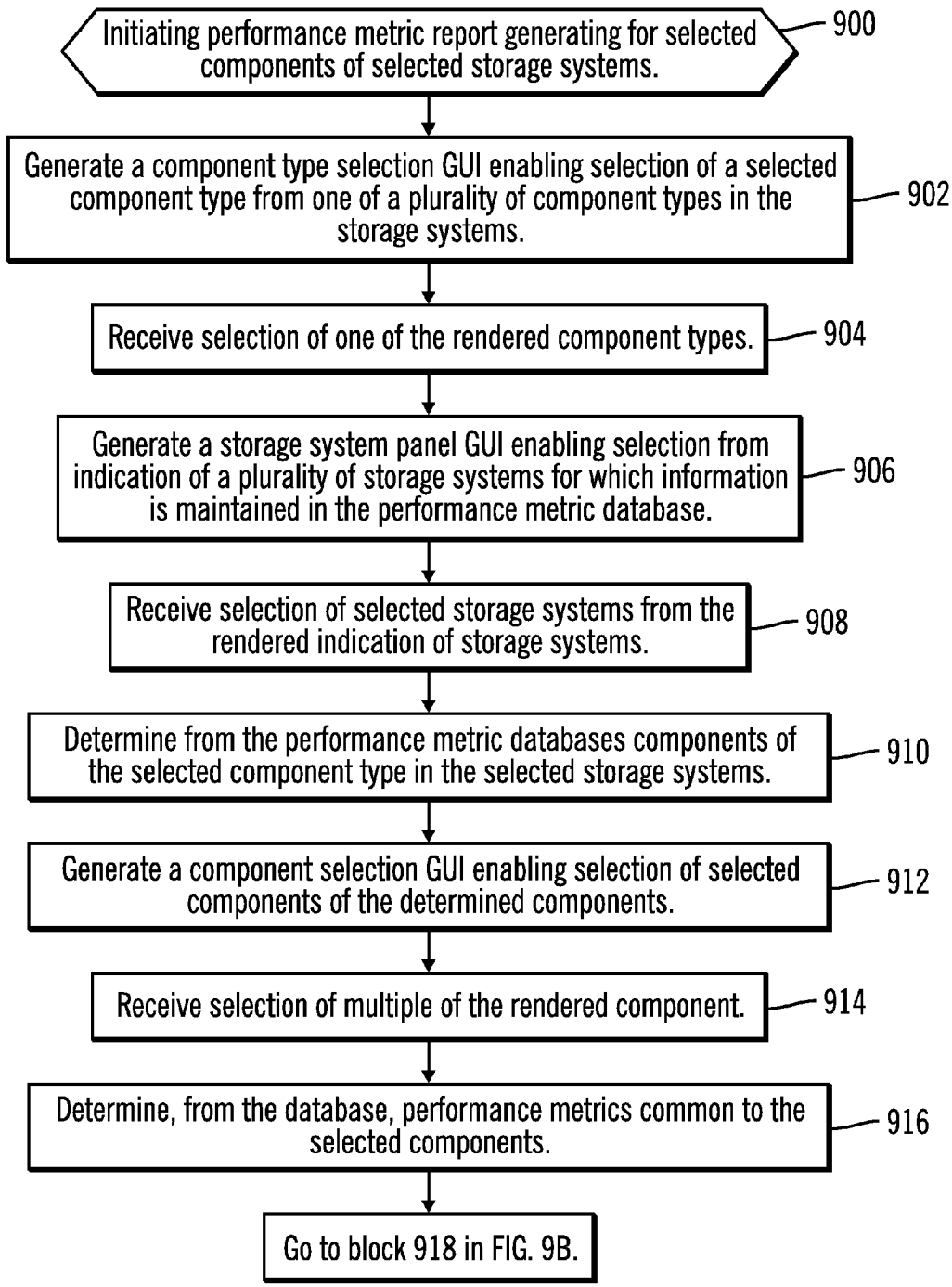
Figure 9B:
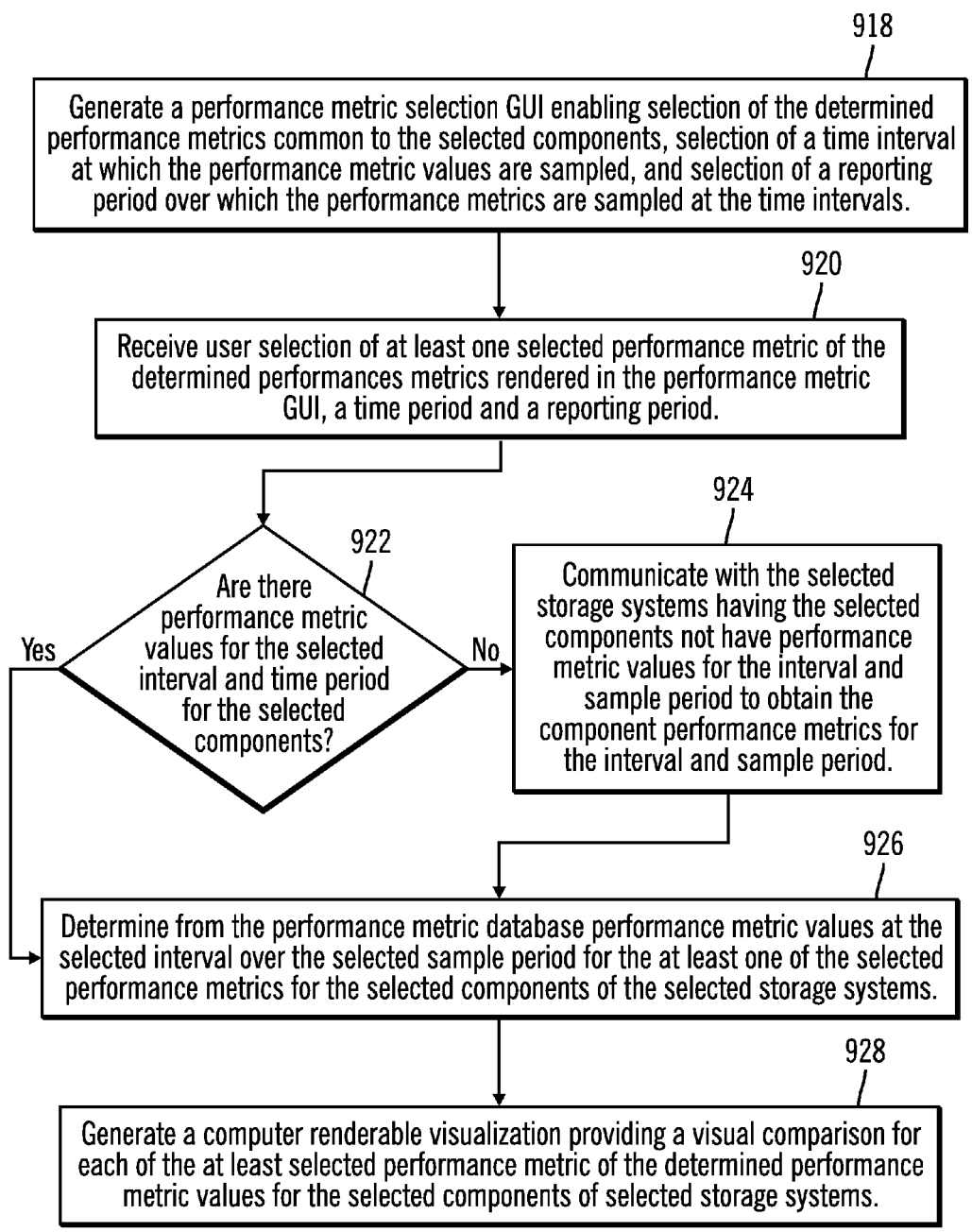
Figure 10:
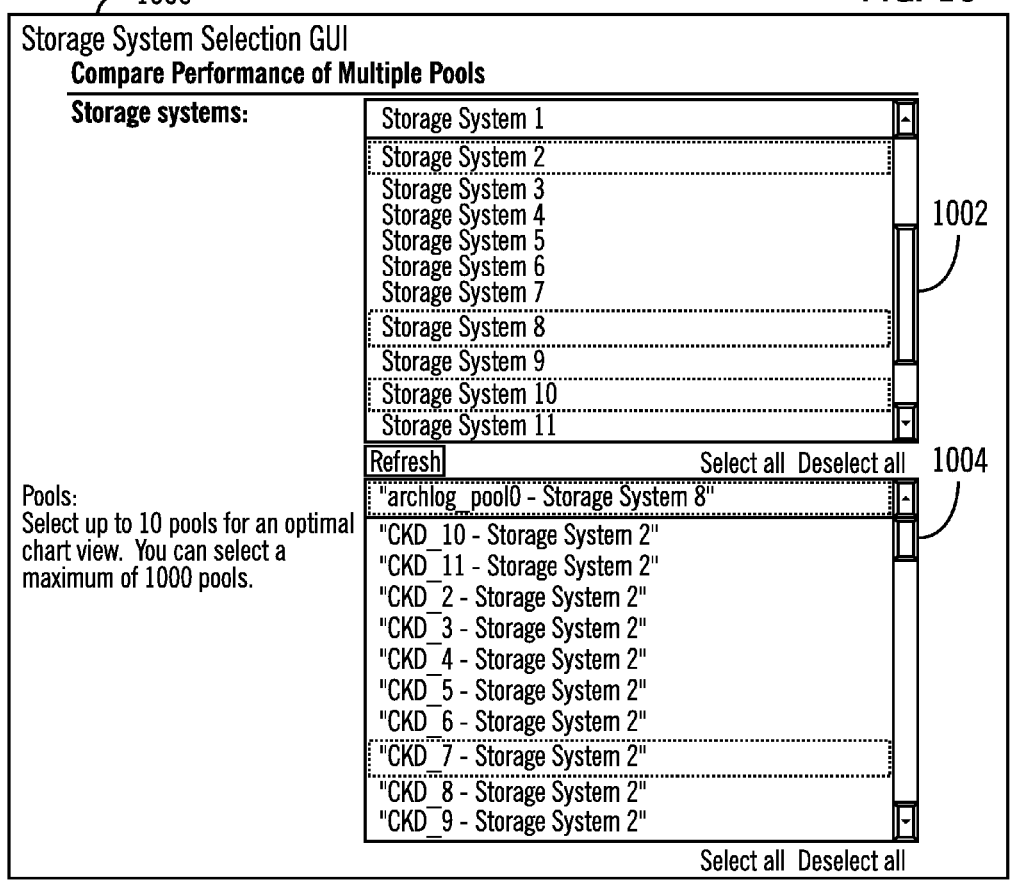
FIG. 10 illustrates an embodiment of a storage pool selection GUI.

FIGS. 9a and 9b illustrate an embodiment of operations performed by the storage performance manager 108 to provide a series of graphical user interface (GUI) panels to enable a user to select options to generate a performance report that compares performance metrics across storage systems $200_1$, $200_2$, $200_3$ . . . $200_n$ and components in storage systems, such as configured storage resources 204, computational resources 214, and storage devices 202. Upon initiating (at block 900) performance metric report generating, the storage performance manager 108 generates (at block 902) a component type selection GUI enabling selection of a selected component type from one of a plurality of component types in the storage systems, such as through drop down menu, selectable list or other GUI element to enable selection from one of a plurality of component types. The performance metric database 110 may maintain information on the possible component types in the storage systems $200_1$, $200_2$, $200_3$ . . . $200_n$. Upon receiving selection (at block 904) of a selected component type rendered in the component type selection GUI, the storage performance manager 108 generates (at block 906) a storage system selection GUI 1002 in FIG. 10 enabling selection from indication of a plurality of storage systems $200_1$, $200_2$, $200_3$ . . . $200_n$ for which information 300 is maintained in the performance metric database 110. FIG. 10 illustrates an example of the storage system selection GUI 1000 having a drop down menu 1002 from which the user selects one of the storage systems $200_1$, $200_2$, $200_3$ . . . $200_n$, where the selected storage systems are shown as highlighted.

Upon receiving (at block 908) selection of selected storage systems from the storage system selection GUI 1000, the storage performance manager 108 determines (at block 910) from the performance metric databases 110 components of the selected component type in the selected storage systems. In one embodiment, the components may be determined by computer processing the performance metric information 300 for each of the selected storage systems 302 to determine particular components 304 of the selected component type. A component selection GUI enabling selection of selected components of the determined components is generated (at block 912). The components may be listed in a drop down list from which multiple may be selected or with other GUI selection techniques. FIG. 10 illustrates an example of the component selection GUI 1004 in which the user has selected components from the selected storage systems, which components are storage pools 208 in FIG. 10.

Upon receiving (at block 914) selection of multiple of the rendered components from one or more storage systems $200_1$, $200_2$, $200_3$ . . . $200_n$, the storage performance manager 108 determines (at block 916) from the performance metric database 110, performance metrics common to the selected components. These may be determined by determining from the performance metric information 300 for the selected components 302 the performance metrics $306_1$, $306_2$ . . . $306_n$ in common among all the selected components 302.

Control proceeds to block 918 in FIG. 9b where the storage performance manager 108 generates a performance metric selection GUI enabling selection of the determined performance metrics common to the selected components, selection of a time interval at which the performance metric values are sampled, and selection of a reporting period over which the performance metrics are sampled at the time intervals.

Figure 11:
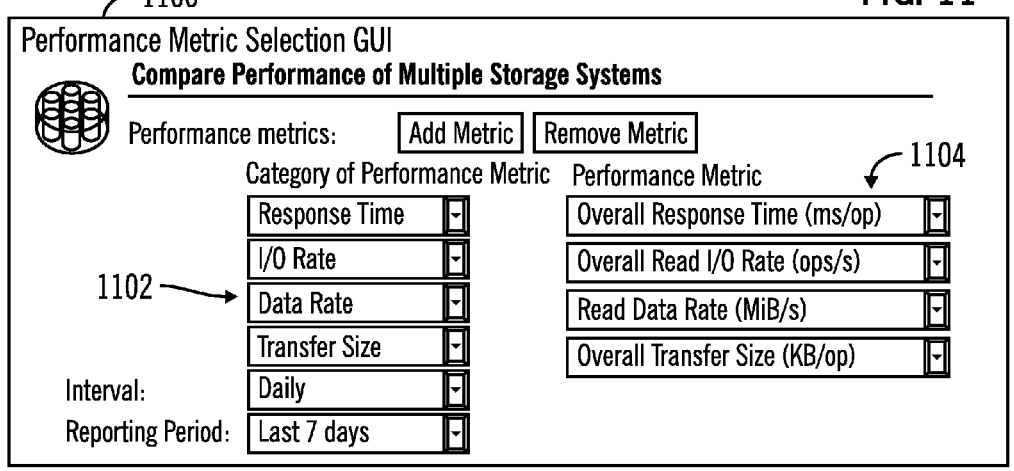
FIG. 11 illustrates an embodiment of a GUI to allow performance metric selection for storage pools.

FIG. 11 illustrates an example of the performance metric selection GUI 1100 showing different categories of selected performance metrics 1102 common to the selected components that may be selected. The user may select a category of common performance metrics 1102 using the drop down menus, where selection is made of the performance metric categories of Response Time, I/O Rate, Data Rate, Transfer Size along with the Interval and sample period. The performance metric selection GUI 1100 has the selected performance metrics 1104 selected from the selected categories 1102, such as overall response time, overall read I/O rate, total data rate, and overall transfer size. Further, the drop down menus 1104 in the GUI 1100 to select specific performance metrics for the selected categories are further shown in FIGS. 6a, 6b, 6c.

Upon receiving (at block 920) user selection of at least one selected performance metric of the determined performances metrics rendered in the performance metric selection GUI 1100 (FIG. 11), a time period and a reporting period, the storage performance manager 108 determines (at block 922) whether the performance metric database 110 includes performance metric values for the selected interval and time period for the selected storage systems. If there are not performance metric values for the selected interval and time period, then the storage performance manager 108 communicates (at block 924) with the selected storage systems $200_1$, $200_2$, $200_3$, . . . , $200_n$ not having performance metric values for the interval and sample period to obtain the performance metrics for the interval and sample period and store in the performance metric database 110. If (at block 922) the performance metric database 110 already has the values for the interval and time period or after obtaining requested metrics (from block 922), the storage performance manager 8 determines (at block 926) from the performance metric database 110 performance metric values at the selected interval over the selected sample period for the at least one of the selected performance metrics for the selected storage systems. The storage performance manager 108 generates (at block 928) a computer renderable visualization providing a visual comparison for each of the at least selected performance metric of the determined performance metric values for the selected storage systems.

Figure 12:
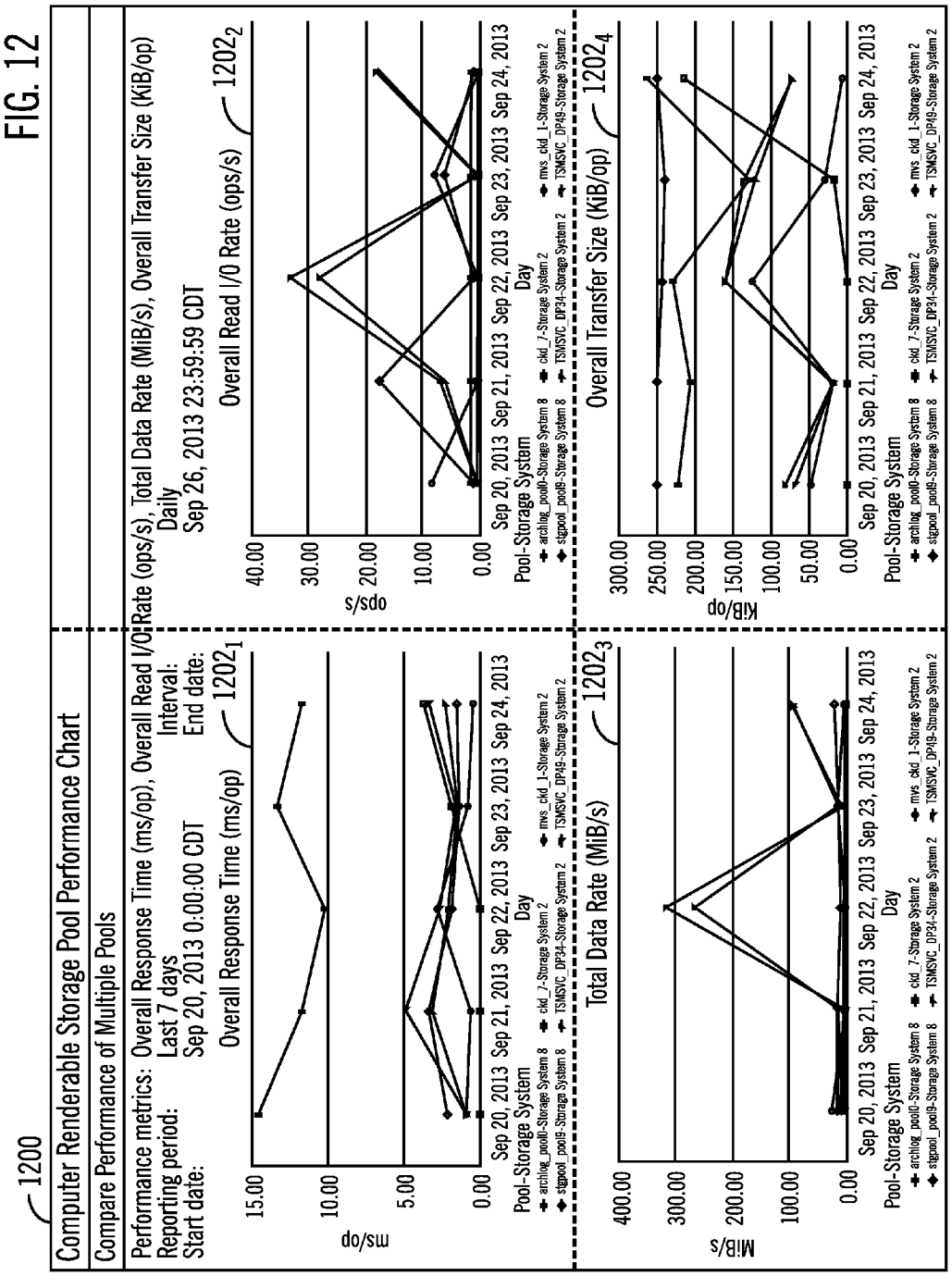
Figure 12A:
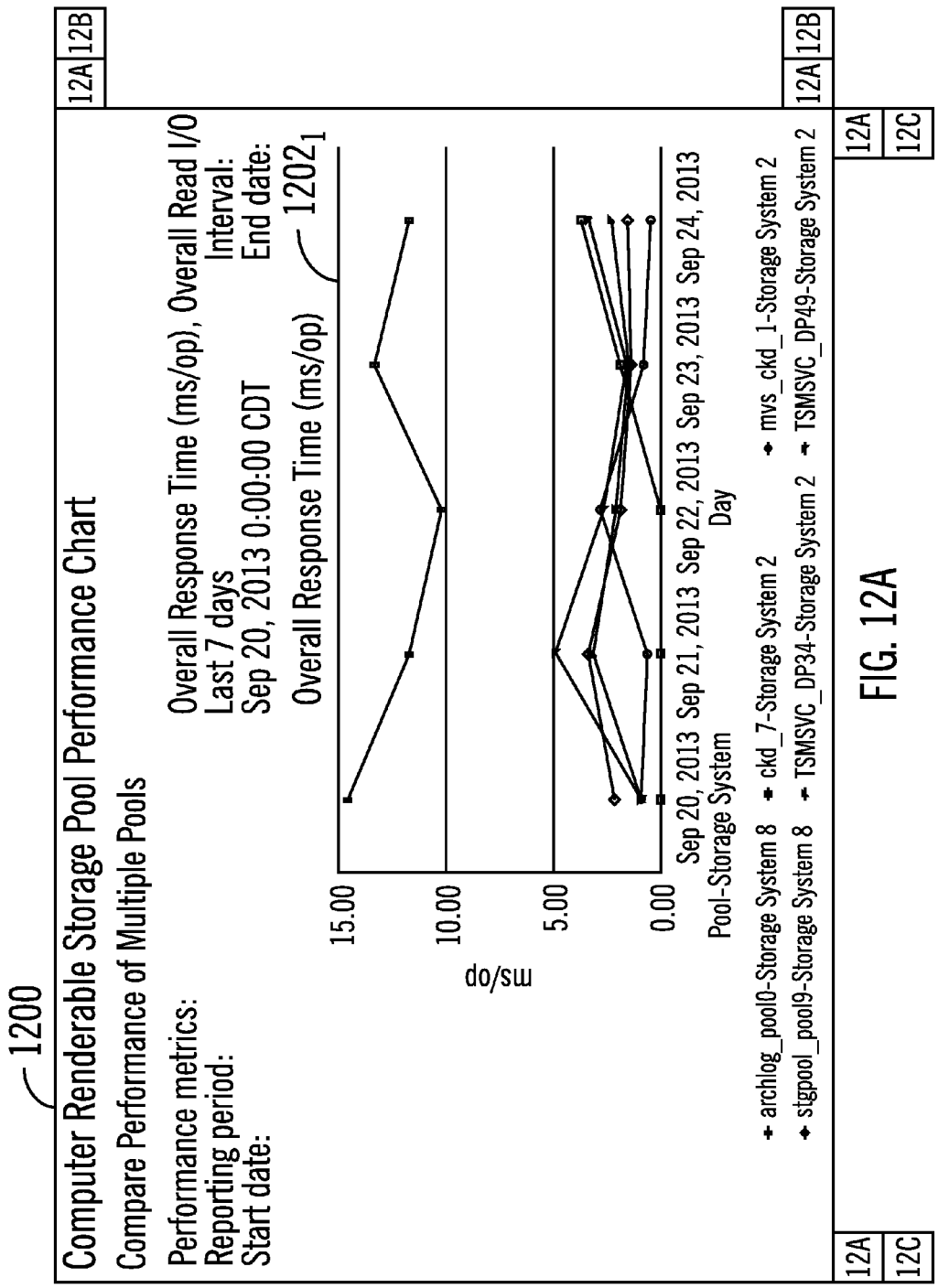
Figure 12B:
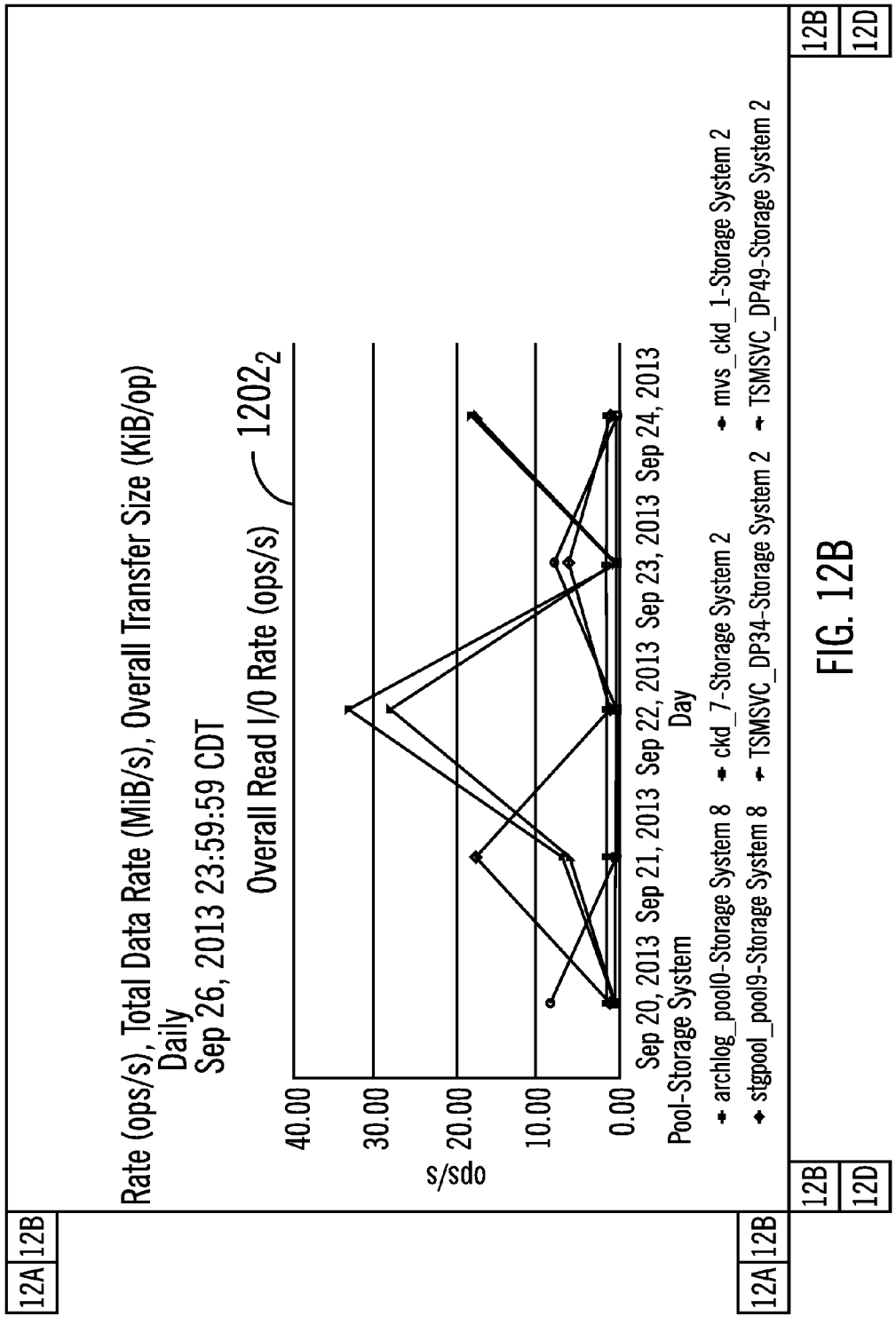
Figure 12C:
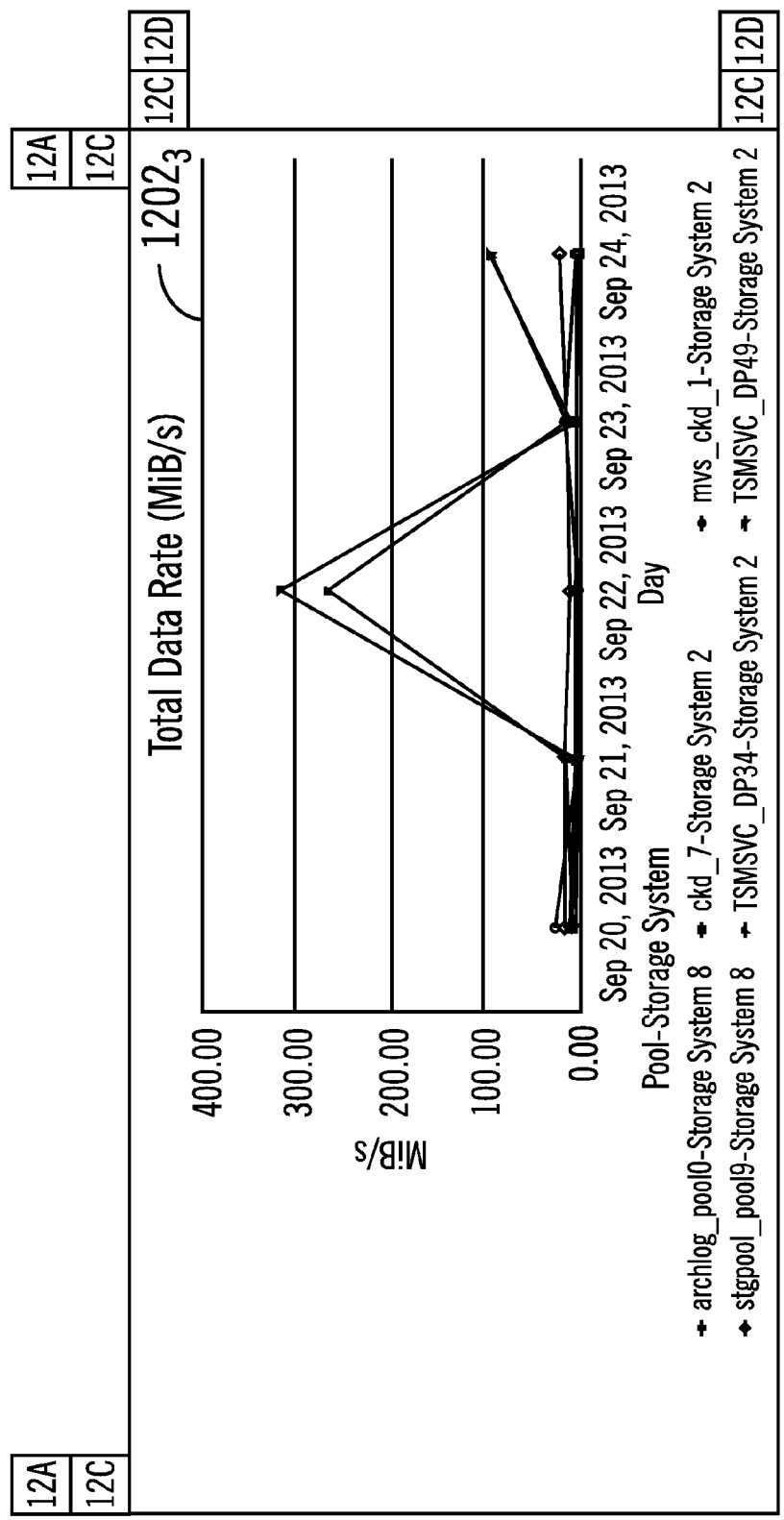
Figure 12D:
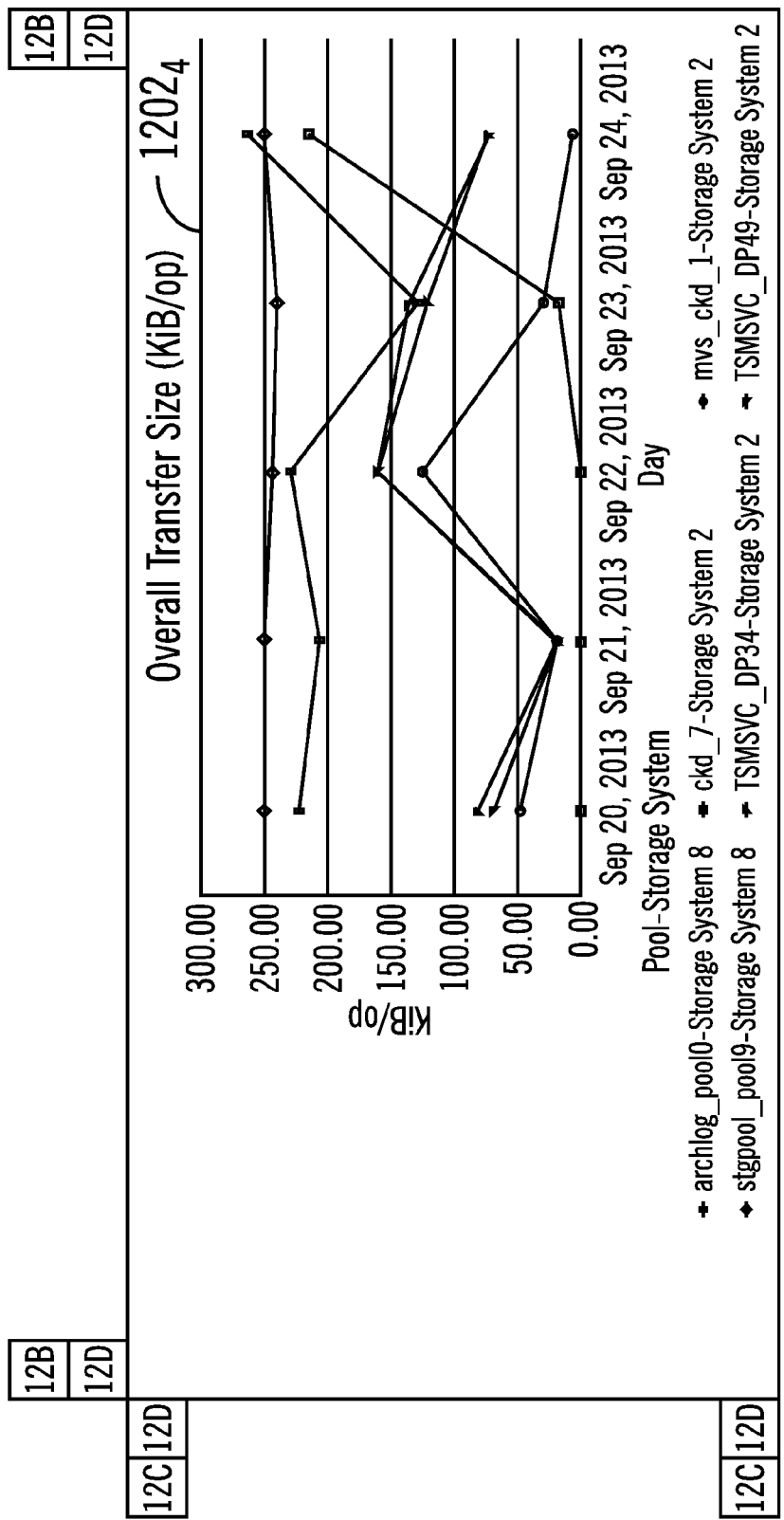

FIG. 12 illustrates an example of a computer renderable storage system performance chart 1200 generated at block 928 in FIG. 9b, where FIGS. 12A, 12B, 12C, and 12D provide expanded views of the panels in FIG. 12. FIG. 12 shows a plurality of sub-visualizations for the selected performance metrics that shows for each performance metric a chart having a graph of the performance metric values over the selected storage systems. FIG. 12 shows four sub-visualizations including an overall response time (ms/operation) visualization $1202_1$ (FIG. 12A), an overall read I/O rate visualization (operations per second) $1202_2$ (FIG. 12B), a total read data rate $1202_3$ (MB per second) (FIG. 12C), and an overall transfer size $1202_4$ (FIG. 12D).

FIG. 13 illustrates an example of a computer renderable storage system performance chart table 1300 generated at block 928 in FIG. 9b. FIG. 13 shows a plurality of sub-visualizations for the selected performance metrics that shows for each performance metric a column of values for each of the selected storage systems. FIG. 13 shows four sub-visualizations including an overall response time (ms/ operation) visualization $1302_1$, an overall read I/O rate visualization (operations per second) $1302_2$, a total data rate $1302_3$ (MB per second), and an overall transfer size visualization $1302_4$. The table 1300 further has groupings of storage systems 1304 in the second row of the table, and for each storage system, columns 1306 for the components for which the performance metric values are listed.

Described embodiments provide techniques to gather performance metrics for different identifiable components of configuration storage resources 204 and computational resources 214 across different storage systems, which may include virtual and non-virtual storage systems and heterogeneous storage systems from one vendor or different vendors. Described embodiments allow the user to generate visualizations for different selected performance metrics across different storage systems for selected components or the storage systems as a whole.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 14:
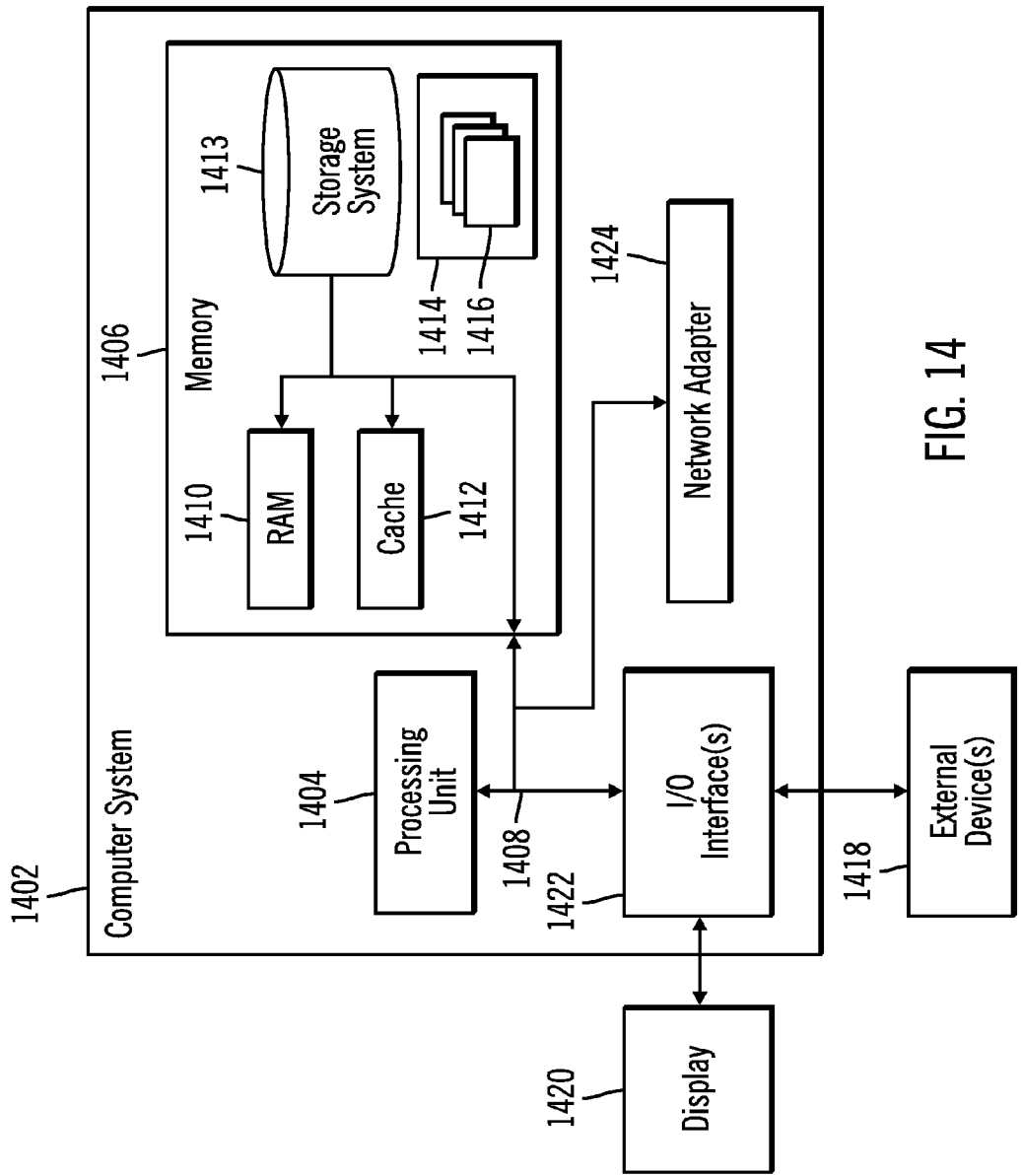
FIG. 14 illustrates an embodiment of computing components.

The elements of the computing environment of FIG. 1, including the storage systems 200₁, 200₂, 200₃ . . . 200ₙ and the storage manager 106 may be implemented in one or more computer systems, such as the computer system 302 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 1416 which generally carry out the functions and/or methodologies of embodiments of the invention as described herein. The components of the computing environment may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 12; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing performance metrics on storage systems, wherein the computer program product comprises a non-transitory computer readable storage medium having computer readable program code embodied therein that executes to perform operations, the operations comprising:
generating a storage system graphical user interface (GUI) rendering indication of a plurality of storage systems, wherein each of the indicated storage systems includes components comprising usable storage space configured in storage devices and computational resources;
receiving selection of a plurality of the storage systems from the rendered indication of the storage systems;
processing performance metric information in a database for each of the selected storage systems, wherein the performance metric information for each of the selected storage systems includes performance metrics for the storage system;
determining, from the performance metric information for each of the selected storage systems, common performance metric types common to the selected storage systems;
generating a performance metric selection GUI rendering selectable performance metric types of the determined common performance metric types enabling selection of at least one of the determined common performance metric types common to the selected storage systems;
rendering in the performance metric selection GUI a plurality of selectable specific performance metrics for each of selected performance metric types of the determined common performance metric types;
in response to user selection of at least one of the rendered specific performance metrics in the performance metric selection GUI for each of the selected performance metric types, determining performance metric values for the at least one of the selected specific performance metrics for each of the selected performance metric types for the selected storage systems; and
generating a computer renderable visualization providing a visual comparison of the determined performance metric values for each of the at least one of the selected specific performance metrics for the selected storage systems.

2. The computer program product of claim 1, wherein the generated performance metric selection GUI enables selection of a time interval at which the performance metric values are sampled and selection of a reporting period over which the performance metric values are sampled at the time interval.

3. The computer program product of claim 1, wherein the determined common performance metric types are from performance metric types comprising at least one of response times, data rates, Input/Output (I/O) rates, cache percentages, and transfer size.

4. The computer program product of claim 1, wherein there are a plurality of the at least one of the selected performance metric types, wherein generating the computer renderable visualization comprises generating a sub-visualization for each of the selected specific performance metrics for each of the selected performance metric types that groups the selected specific performance metrics by the selected storage systems.

5. The computer program product of claim 4, wherein the generating the sub-visualization for each of the selected specific performance metrics comprises generating a computer renderable chart displaying lines showing values for the selected specific performance metric for the selected storage systems.

6. The computer program product of claim 1, wherein the operations further comprise:
determining, from the database, components of a component type in the selected storage systems;
generating a component GUI enabling selection of the determined components, wherein the determined common performance metric types common to the selected storage systems comprise performance metric types common to selected components in the selected storage systems, wherein the performance metric selection GUI enables selection of the determined common performance metrics common to the selected components;
wherein the determining the performance metric values for the selected storage systems comprises determining performance metric values for the at least one of the selected specific performance metrics for the selected components of the selected storage systems; and
wherein the generated computer renderable visualization provides the visual comparison of the determined performance metric values for each of the at least one of the selected specific performance metrics for the selected components of the selected storage systems.

7. The computer program product of claim 6, wherein there are a plurality of the at least one of the selected performance metric types, wherein generating the computer renderable visualization comprises generating a sub-visualization for each of the selected specific performance metrics for each of the selected performance metric types that groups one of the selected performance metric types by the selected components and the selected storage systems.

8. The computer program product of claim 7, wherein the generating the sub-visualization for each of the selected performance metrics comprises generating a computer renderable table providing columns of values of the common performance metric for each of the selected components and groups the columns by the selected components and the selected storage systems.

9. The computer program product of claim 7, wherein the selected components comprise selected storage resources configured in the selected storage systems, and wherein each sub-visualization provides a visualization of the performance metric values for one of the selected specific performance metrics for one of the selected performance metric types for the selected storage resources of the selected storage systems.

10. The computer program product of claim 1, wherein the selected storage systems comprise virtual storage systems and non-virtual storage systems, and wherein the storage systems comprise heterogeneous storage systems from different vendors.

11. A system for providing performance metrics on storage systems, comprising:
a processor; and
a computer readable storage medium having computer program code executed by the processor to perform operations, the operations comprising:
generating a storage system graphical user interface (GUI) rendering indication of a plurality of storage systems, wherein each of the indicated storage systems includes components comprising usable storage space configured in storage devices and computational resources;
receiving selection of a plurality of the storage systems from the rendered indication of the storage systems;
processing performance metric information in a database for each of the selected storage systems, wherein the performance metric information for each of the selected storage systems includes performance metrics for the storage system;
determining, from the performance metric information for each of the selected storage systems, common performance metric types common to the selected storage systems;
generating a performance metric selection GUI rendering selectable performance metric types of the determined common performance metric types enabling selection of at least one the determined common performance metric types common to the selected storage systems;
rendering in the performance metric selection GUI a plurality of selectable specific performance metrics for each of selected performance metric types of the determined common performance metric types;
in response to user selection of at least one of the rendered specific performance metrics in the performance metric selection GUI for each of the selected performance metric types, determining performance metric values for the at least one of the selected specific performance metrics for each of the selected performance metric types for the selected storage systems; and
generating a computer renderable visualization providing a visual comparison of the determined performance metric values for each of the at least one of the selected specific performance metrics for the selected storage systems.

12. The system of claim 11, wherein the generated performance metric selection GUI enables selection of a time interval at which the performance metric values are sampled and selection of a reporting period over which the performance metric values are sampled at the time interval.

13. The system of claim 11, wherein there are a plurality of the at least one of the selected performance metric types, wherein generating the computer renderable visualization comprises generating a sub-visualization for each of the selected specific performance metrics for each of the selected performance metric types that groups the selected performance metrics by the selected storage systems.

14. The system of claim 11, wherein the operations further comprise:
determining, from the database, components of a component type in the selected storage systems;
generating a component GUI enabling selection of the determined components, wherein the determined common performance metric types common to the selected storage systems comprise performance metric types common to selected components in the selected storage systems, wherein the performance metric selection GUI enables selection of the determined common performance metrics common to the selected components;
wherein the determining the performance metric values for the selected storage systems comprises determining performance metric values for the at least one of the selected specific performance metrics for the selected components of the selected storage systems; and
wherein the generated computer renderable visualization provides the visual comparison of the determined performance metric values for each of the at least one of the selected specific performance metrics for the selected components of the selected storage systems.

15. The system of claim 14, wherein there are a plurality of the at least one of the selected performance metric types, wherein generating the computer renderable visualization comprises generating a sub-visualization for each of the selected specific performance metrics for each of the selected performance metric types that groups one of the selected performance metric types by the selected components and the selected storage systems.

16. A method for providing performance metrics on storage systems, comprising:
generating a storage system graphical user interface (GUI) rendering indication of a plurality of storage systems, wherein each of the indicated storage systems includes components comprising usable storage space configured in storage devices and computational resources;
receiving selection of a plurality of the storage systems from the rendered indication of the storage systems;
processing performance metric information in a database for each of the selected storage systems, wherein the performance metric information for each of the selected storage systems includes performance metrics for the storage system;
determining, from the performance metric information for each of the selected storage systems, common performance metric types common to the selected storage systems;
generating a performance metric selection GUI rendering selectable performance metric types of the determined common performance metric types enabling selection of at least one of the determined common performance metric types common to the selected storage systems;
rendering in the performance metric selection GUI a plurality of selectable specific performance metrics for each of selected performance metric types of the determined common performance metric types;
in response to user selection of at least one of the rendered specific performance metrics in the performance metric selection GUI for each of the selected performance metric types, determining performance metric values for the at least one of the selected common performance metrics for each of the selected performance metric types for the selected storage systems; and
generating a computer renderable visualization providing a visual comparison of the determined performance metric values for each of the at least one of the selected specific performance metric for the selected storage systems.

17. The method of claim 16, wherein the generated performance metric selection GUI enables selection of a time interval at which the performance metric values are sampled and selection of a reporting period over which the performance metric values are sampled at the time interval.

18. The method of claim 16, wherein there are a plurality of the at least one of the selected performance metric types, wherein generating the computer renderable visualization comprises generating a sub-visualization for each of the selected specific performance metrics for each of the selected performance metric types that groups the selected specific performance metric by the selected storage systems.

19. The method of claim 16, further comprising:
   determining, from the database, components of a component type in the selected storage systems;
   generating a component GUI enabling selection of the determined components, wherein the determined common performance metric types common to the selected storage systems comprise performance metric types common to selected components in the selected storage systems, wherein the performance metric selection GUI enables selection of the determined common performance metrics common to the selected components;
   wherein the determining the performance metric values for the selected storage systems comprises determining performance metric values for the at least one of the selected specific performance metrics for the selected components of the selected storage systems; and
   wherein the generated computer renderable visualization provides the visual comparison of the determined performance metric values for each of the at least one of the selected specific performance metrics for the selected components of the selected storage systems.

20. The method of claim 19, wherein there are a plurality of the at least one of the selected performance metric types, wherein generating the computer renderable visualization comprises generating a sub-visualization for each of the selected specific performance metrics for each of the selected performance metric types that groups one of the selected performance metric types by the selected components and the selected storage systems.

* * * * *